United States Patent [19]
Yeh et al.

[11] Patent Number: 5,884,652
[45] Date of Patent: Mar. 23, 1999

[54] 2/3 HANDLE PRESSURE BALANCER SYSTEM

[75] Inventors: Yuhung Edward Yeh, Tarzana; William David Cook, Sherman Oaks; Mark Steven Bloom, Simi Valley, all of Calif.

[73] Assignee: Emhart Inc., Newark, Del.

[21] Appl. No.: 863,246

[22] Filed: May 27, 1997

[51] Int. Cl.⁶ .................................................. G05D 11/16
[52] U.S. Cl. .............................. 137/98; 137/597; 137/607
[58] Field of Search .............................. 137/98, 597, 607, 137/100

[56] References Cited

U.S. PATENT DOCUMENTS

| | | |
|---|---|---|
| 2,308,127 | 1/1943 | Symmons . |
| 3,844,476 | 10/1974 | Bales, Sr. . |
| 3,987,819 | 10/1976 | Scheuermann . |
| 4,033,370 | 7/1977 | Egli . |
| 4,243,063 | 1/1981 | Parkison . |
| 4,774,982 | 10/1988 | Chen . |
| 4,877,181 | 10/1989 | Stewart . |
| 5,025,983 | 6/1991 | Akita .................................. 137/597 X |
| 5,108,032 | 4/1992 | Stewart . |
| 5,344,067 | 9/1994 | Axelsson et al. ................... 137/607 X |
| 5,501,244 | 3/1996 | Shahriar .................................... 137/98 |
| 5,518,019 | 5/1996 | Clare .................................. 137/597 X |

OTHER PUBLICATIONS

"TempShield"–The Chicago Faucet Company, no date.
"Monitor II"–Delta Faucet Company, no date.

*Primary Examiner*—Stephen M. Hepperle
*Attorney, Agent, or Firm*—Harold Weinstein

[57] ABSTRACT

A pressure balancer system 10 having a pressure balancer 20 and a temperature controller 24 on one side of the system and a volume controller 14 on the other side of the system. The pressure balancer 20 receives hot and cold water which it discharges into the temperature controller 24 at substantially constant preselected pressure. The temperature controller 24 is adjustable to set the temperature of the flow to keep the temperature of the anti-scald below the maximum temperature of between 115° F. and 120° F. The volume controller received the temperature adjusted flow from the temperature controller and will set the volume of the flow at the desired volume for discharge therefrom.

2 Claims, 6 Drawing Sheets

2/3 HANDLE PRESSURE BALANCER SYSTEM

BACKGROUND OF THE INVENTION

This invention relates to a 2/3 handle pressure balancer system and relates, particularly, to a 2/3 handle pressure balancer having anti-scald protection and two control valves; one for temperature and one for volume, which may be disposed in the conventional location of the hot water and cold water control valves. The 2/3 handle pressure balancer system may be used in multi-station installation, wherein it may be desirable to close single station installations.

With the addition of the anti-scald feature, tub and shower valve controllers have typically used a single handle anti-scald device which loses the classic look and feel of the 2/3 handle faucets. Other prior art methods have not proved any more successful, in that, if the pressure balancer is placed in-line and upstream of the control valves, there is a risk that opening of the hot water valve alone will produce excessive hot water temperature or, if mechanical linkage is used to control the 2/3 handle faucets, that such linkage is complex, costly and subject to mechanical breakdowns. Additionally, in multi-station installation, rather than close the whole system, use of individual station check/stop valves will permit closing of individual stations.

SUMMARY OF THE INVENTION

It is an object of the present invention to provide a 2/3 handle pressure balancer system which is simple to construct, economical to produce and highly accurate in operation.

It is another object of the present invention to provide a 2/3 handle pressure balancer system that has the look and feel of the conventional 2 handle hot and cold control valves, wherein one control valve is for temperature and the other control valve is for volume.

It is another object of the present invention to provide a 2/3 handle pressure balancer system that will permit complete water flow shut-off in different embodiments of the invention at either the temperature control valve, the volume control valve or both.

It is another object of the present invention to provide a 2/3 handle pressure balancer system to use check/stop valves at each of the multi-stations so that is possible to close any one of the individual stations without having to close the whole system.

It is still another object of the present invention to provide a 2/3 handle pressure balancer to include the anti-scald feature at the temperature valve while the other control valve controls volume, but which temperature and volume control valves have the look and feel of the more conventional hot and cold water control valves.

Other objects, features and advantages of the present invention will become more fully apparent from the following detailed description of the present invention, the appended claims and the accompanying drawings.

DRAWINGS

DETAILED DESCRIPTION OF THE INVENTION

Figure 1:
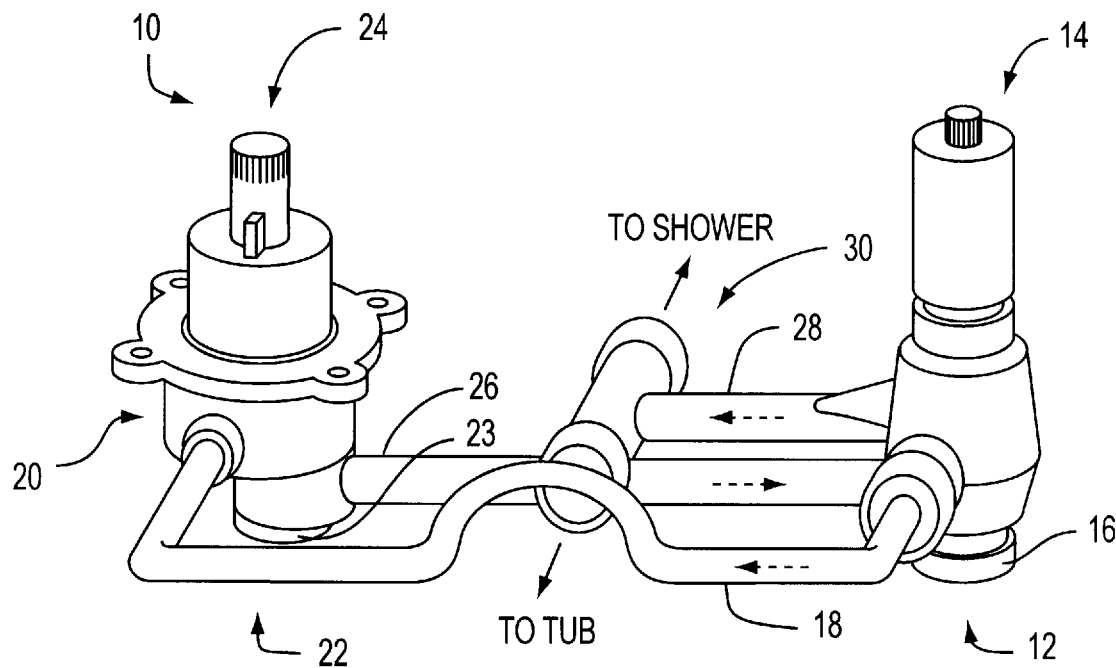
FIG. 1 is a perspective view of the 2/3 handle pressure balancer system having the hot water supply on the same side as the temperature controller and the cold water supply on the same side as the volume controller.

FIG. 1 shows one embodiment of the 2/3 handle pressure balancer system 10 that has a cold water supply 12 entering a volume controller 14 through inlet 16 to be shunted in line 18 in the direction of the dotted line arrow into a pressure balancer 20 which receives a hot water supply 22 from inlet 23. The pressure balancer 20 will discharge the flow therefrom at a selected pressure and, consequently, temperature into a temperature controller 24 which, in turn, controls the temperature of the flow coming from the pressure balancer 20. As will be described in more detail later, the hot water supply and the cold water supply will be mixed at the temperature controller 24 to set the desired temperature of the flow which is discharged into line 26 in the direction of the dotted line arrow. Line 26 is connected to the volume controller 14 to deliver the mixed flow at the desired temperature thereto. The volume controller 14 will be adjusted to set the volume of the flow for discharge in the direction of the dotted line arrow into line 28, that delivers the flow to a flow diverter 30 for final discharge to either the shower (not shown) or the tub (not shown).

It will be understood that the major components of the 2/3 handle pressure balancer system 10 including the volume controller 14, the pressure balancer 20, the temperature controller 24 and the fluid diverter 30 illustrated in FIG. 1 may be the same or similar to the components shown and illustrated in the second embodiment of the invention depicted in FIGS. 2 through 6 and will have the same reference characters as that used in FIG. 1.

Figure 2:
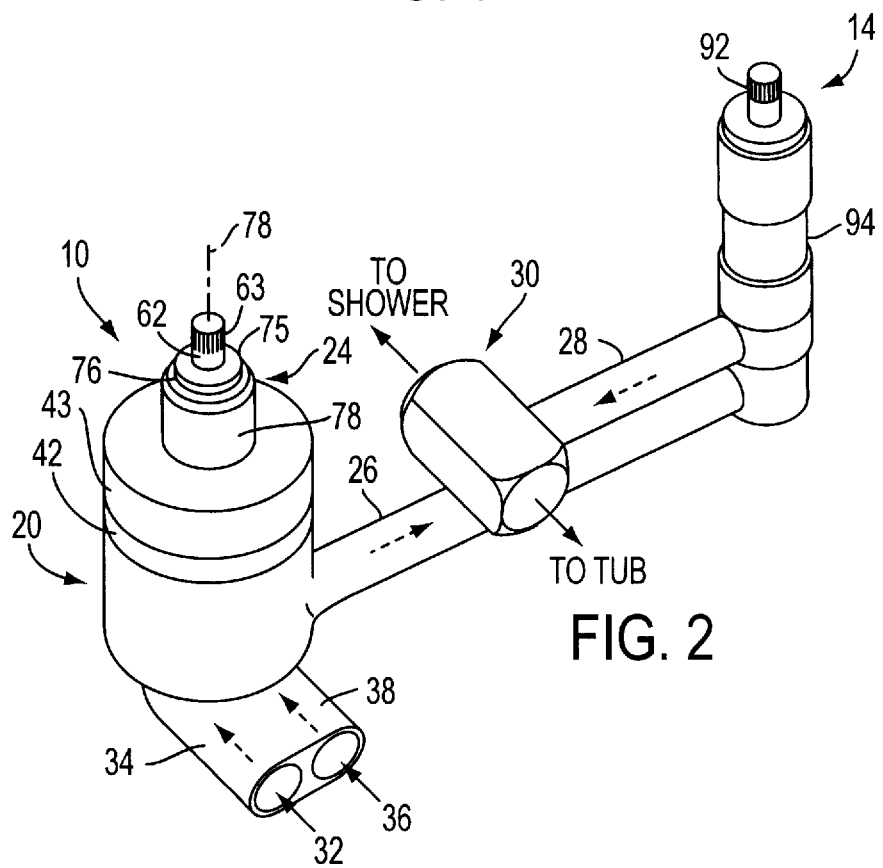
FIG. 2 is a perspective view of the 2/3 handle pressure balancer system, modified to show hot and cold water supply on the same side as the pressure and balancer temperature control valve.

FIG. 2 shows a second embodiment of the present invention wherein like components will be designated with the same reference characters as was used to describe those components in FIG. 1. Accordingly, the hot water supply 32 enters the pressure balancer 20 in the direction of the dotted line arrow from inlet 34 and the cold water supply 36 enters the pressure balancer 20 in the direction of the dotted line arrow from inlet 38. The discharge from the pressure balancer 20 enters the temperature controller 24 which is adapted to keep the temperature of the flow below the maximum anti-scald temperature of between 115° F. and 120° F. The mixed flow is discharged from the temperature controller 24 in the direction of the dotted line arrow in line 26 to be delivered to the volume controller 14. The volume controller 14 is adjustable to select the volume of the flow to be discharged therefrom into line 28 in the direction of the dotted line arrow to be delivered to the flow diverter 30. The flow which is at the desired temperature and volume will be selectively discharged by the flow diverter 30 into the shower (not shown) or the tub (not shown).

Figure 3:
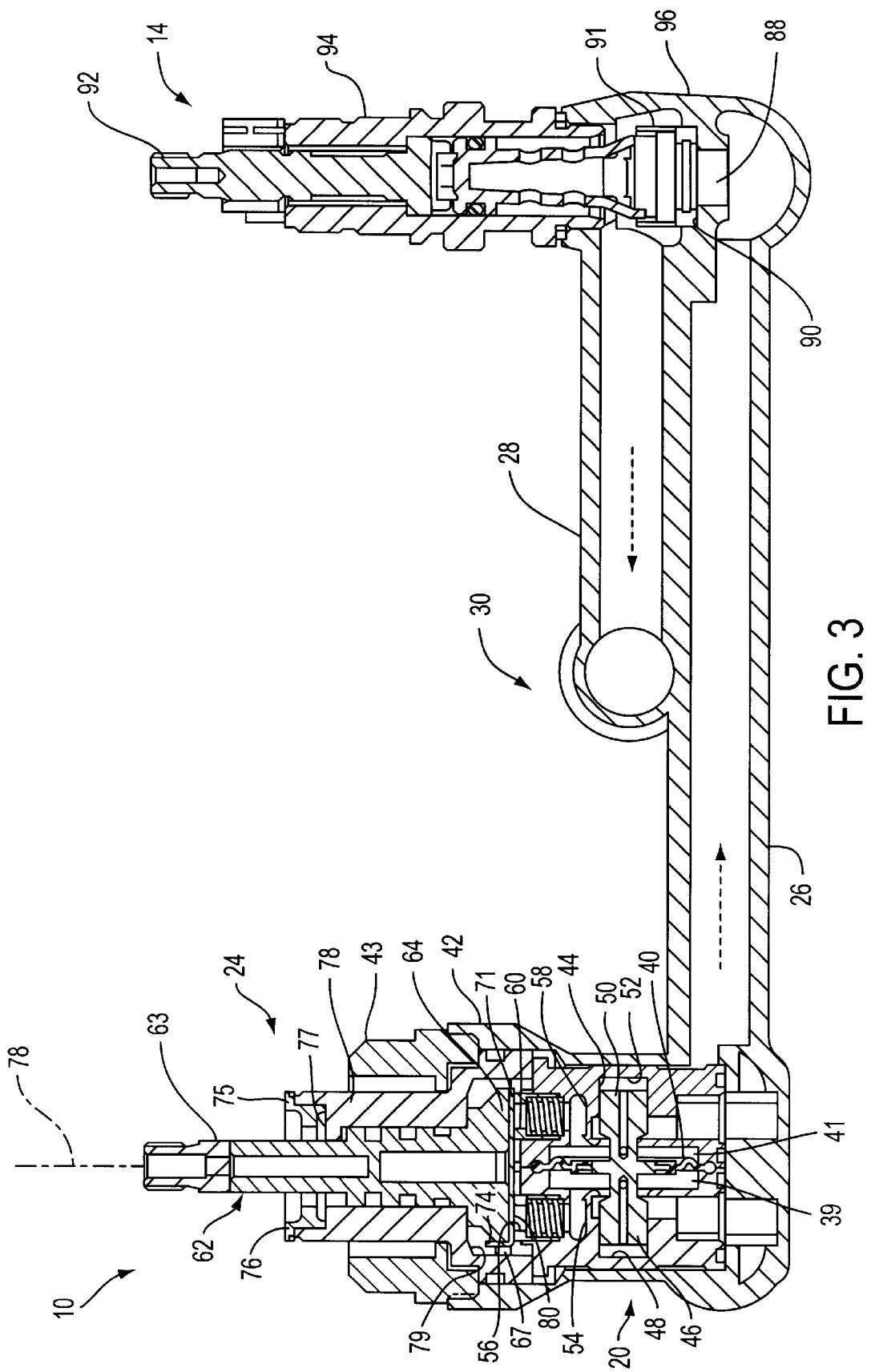
FIG. 3 is a side elevational view of FIG. 2.
Figure 4:
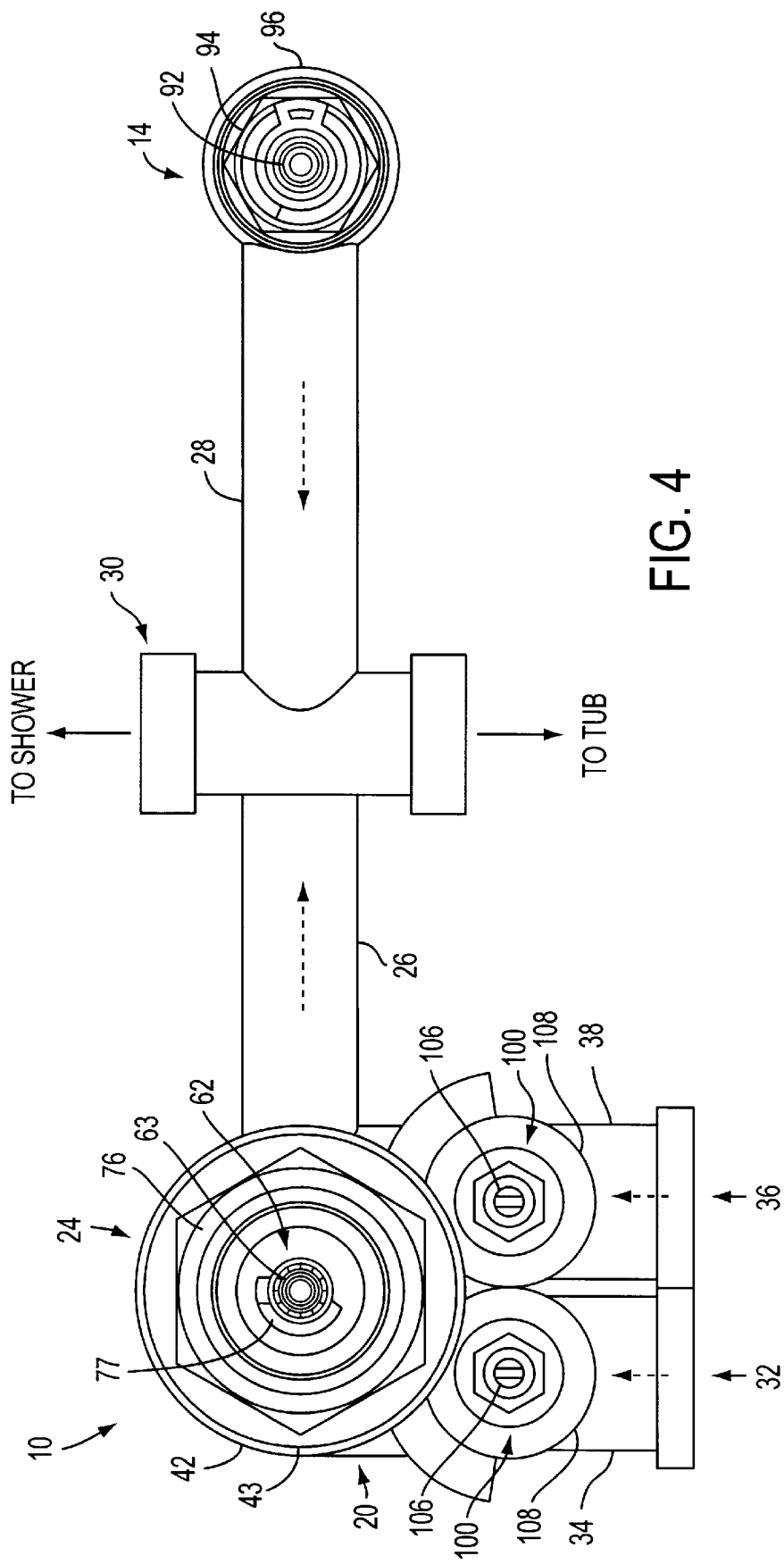
FIG. 4 is a top plane view of FIG. 2.
Figure 5:
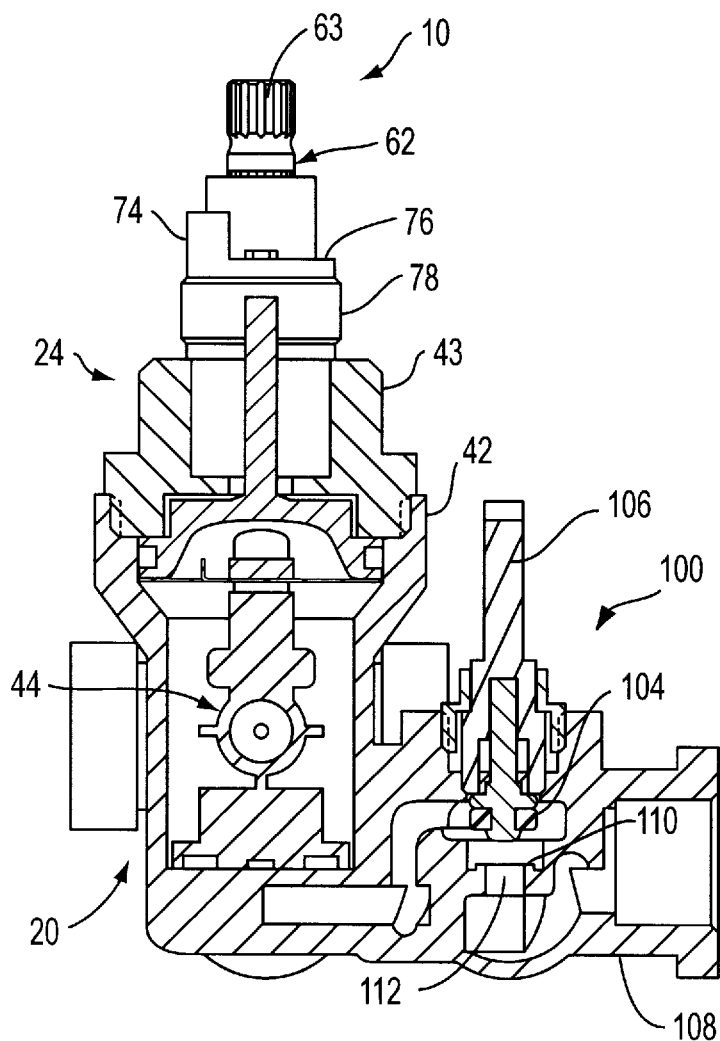
FIG. 5 is a side elevational view of FIG. 2 showing the pressure balancer and the temperature controller viewed looking from the left side of FIG. 2 and including the check/stop valve.

The pressure balancer system 10 of FIG. 2 and the components thereof are show in greater detail in FIGS. 3 through 6. The pressure balancer 20 is illustrated in FIGS. 3 and 5 is the type which uses a diaphragm, as was described and illustrated in U.S. Pat. No. 5,501,244, issued Nov. 14, 1994, but could be of another type such as temperature responsive or spool type pressure balancer. The pressure balancer system 10 includes the anti-scald feature which maintains the temperature level selected by the user and will suitably mix the hot and cold water and automatically adjust for any pressure changes in the hot and cold water supplies. Failure of either the hot or the cold water supply will cause the pressure balancer 20 to stop the flow therethrough. The hot water enters in inlet 34 in the direction of the dotted line arrow to pass on the hot water side 39 and the cold water enters in inlet 38 (FIG. 4) in the direction of the dotted line arrow to pass on the cold water side 41 of the diaphragm 40, as shown best in FIG. 3. The pressure balancer 20 and the temperature controller 24 are disposed within a unitary housing 42 having a bonnet 43 connected to the upper end thereof. The bonnet 43 encloses and connects the temperature controller 24 to the housing 42. The diaphragm 40 is part of a poppet assembly 44 having a hot water poppet 46 disposed in a well 48 formed in the hot water side 39 and a cold water poppet 50 disposed in a well 52 formed in the cold water side 41. The water on the hot water side 39 enters a chamber 54 that communicates through a sealed port 56 to pass into the temperature controller 24 as described more fully hereinafter in FIG. 6. The water on the cold water side 41 enters a chamber 58 that communicates through a sealed port 60 to pass into the temperature controller 24 as more fully described in FIG. 6. FIG. 3 shows the poppet assembly 44 in a neutral position wherein the pressure on the hot water side 39 is balanced against the pressure on the cold water side 41. However, it is understood that if the hot water supply 32 or the cold water supply 36 fails, the poppet assembly 44 will stop the flow. Alternately, the pressure balancer 20 will automatically adjust to pressure changes in the hot water supply 32 and the cold water supply 36 by having the diaphragm 40 cause the hot water poppet 46 or the cold water poppet 50 shift from the neutral position shown in FIG. 3 in the wells 46 and 52, respectively, to shift as a unit further into or out of said wells 46 and 52 to adjust the openings (not shown) through the poppet assembly 44 to selectively increase or decrease such openings to continuously balance the pressure on the hot water side 39 and the cold water side 41 of the diaphragm 40 thus allowing more or less hot or cold water from the respective chambers 54 and 58 of the pressure balancer 20 into the temperature controller 24.

Figure 6:
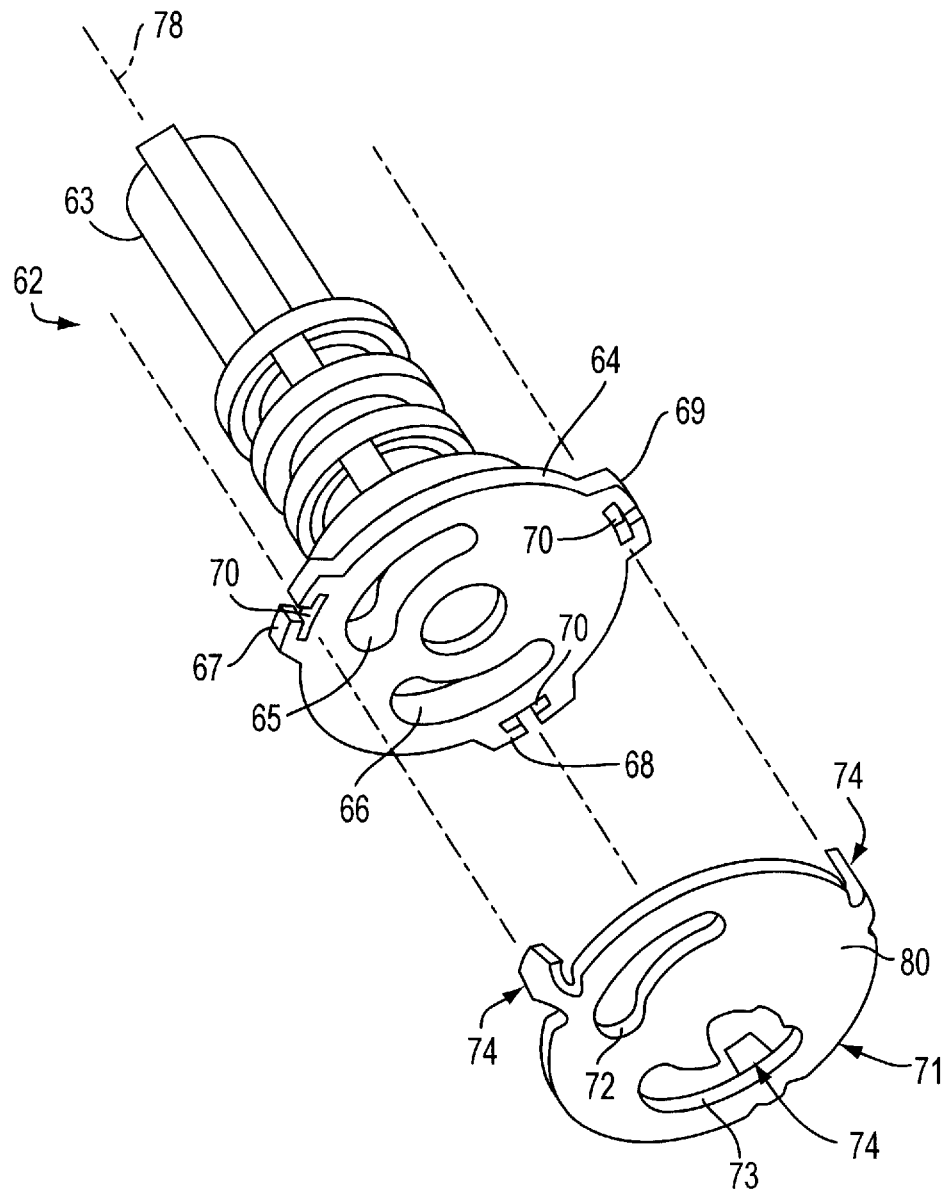
FIG. 6 is an exploded view of a base with stem and a throttle plate of the temperature controller shown in FIGS. 1 and 2.

The temperature controller 24, shown in detail in FIGS. 3 and 6, has a control element 62 formed with a stem 63 and a disc-like base 64 having a pair of generally tear-shaped through holes 65 and 66. Three equally spaced radially extending ears 67, 68 and 69 are formed on the periphery of the base 64, each having an internal recess 70 that extends in a tangential direction to the circumference. A stainless steel throttle plate 71 is formed in a disc-like shape and of similar size as the base 64. The plate 71 is formed with a pair of generally tear-shaped through holes 72 and 73 which align with holes 65 and 66, respectively, when the plate is assembled with the bottom surface of base 64. Three spaced tabs 74 are formed on the periphery of the plate 71 bent in the direction of the base 64. In assembly, the tabs 74 extend through the recesses 70 to affix the plate 71 to the base 64. The tabs 74 are tapered and necked down near the plate 71 so that, once inserted into the recess 70, it will be locked in place. Also, once the tabs 74 have been inserted through the recesses 70, the free end of the tabs 74 may be bent against the respective ears 67, 68 and 69 to lock the plate 71 against the base 64. The temperature controller 24 has a disc 75 of an adjustable temperature limit stop facility 76 that is located in a recess 77 formed in an upper housing 78 fixedly mounted within the bonnet 43. The underside of the plate 71 engages the upper surface of the sealed ports 56 and 60 in tight rotatable engagement thereon. The hot water flow path for water flowing from the hot water port 56 includes the tear-shaped holes 65 and 72 of the base 64 and the plate 71, respectively, and mixing chamber 79. In similar fashion, the cold water flow path for water flowing from the cold water port 60 includes tear-shaped holes 66 and 73 of base 64 and plate 71, respectively, and mixing chamber 79.

The user of the temperature controller 24 can adjust the mixture of the hot and cold water in the mixing chamber 79 by turning the knob (not shown) which will cause the stem 63 to turn a like amount, thus rotating the throttle plate 71 with respect to the sealed ports 56 and 60 to shift the respective tear-shaped holes 72 and 73 resulting in adjusting the volume and, consequently, the temperature of the hot and cold water flowing into the mixing chamber 79 to thus establish a water temperature suitable to the user and within the range between the temperature of the cold water supply and the upper range of the anti-scald temperature, generally up to 120° F. Rotation of the stem 63 to place the ports 56 and 60 over the solid portion 80 of the plate 71 will completely stop the flow through the temperature controller 24 and shut down that station of the pressure balancer system 10.

The mixed flow from the mixing chamber 79, at the selected temperature, will flow through passages (not shown) to be discharged from the temperature controller 24 as shown by the dotted line arrow in FIGS. 2, 3 and 4 into line 26 to be delivered to the volume controller 14 wherein it will pass through an opening 88 that has a valve seat 90 formed therein. The flow is adapted to be regulated and/or closed by a valve closure member 91 fixedly connected to a stem 92 of volume controller 14 which will be rotated to raise or lower the closure member 91 relative to the valve seat 90 to adjust to flow therethrough or to stop the flow completely, as shown in FIG. 3. The valve stem 92 is mounted in a housing 94 that is connected to the casting 96 in which the valve closure member 91 is disposed. The casting 96 has the line 26 and the valve seat 90 formed therein. After the mixed flow passes through the opening 88 and the valve seat 90, it will enter a line 28 to be delivered to a flow diverter 30 from which it will be discharged from a shower (not shown) or a tub (not shown).

The 2/3 handle pressure balancer system 10 may be used in a multi-station installation, wherein it may be desirable to close a single station installation. To this end, a top loaded check/stop valve 100 (see FIG. 5) or a bottom loaded check/stop valve 102 (see FIG. 8) may be included as a pair in both the hot water line 34 and the cold water line 38 (see FIG. 4). As best shown in FIG. 5, the check/stop valve 100 has a valve closure member 104 affixed to a valve stem 106 mounted a casting 108 in which the lines 34 and 38 are formed. The casting 108 includes a valve seat 110 formed on an internal partition 111 having an opening 112 about which the seat 110 is formed. The opening 112 will be closed by the closure member 104 engaging the seat 110 to stop the flow through the lines 34 and/or 38 into the pressure balancer 20.

Figure 7:
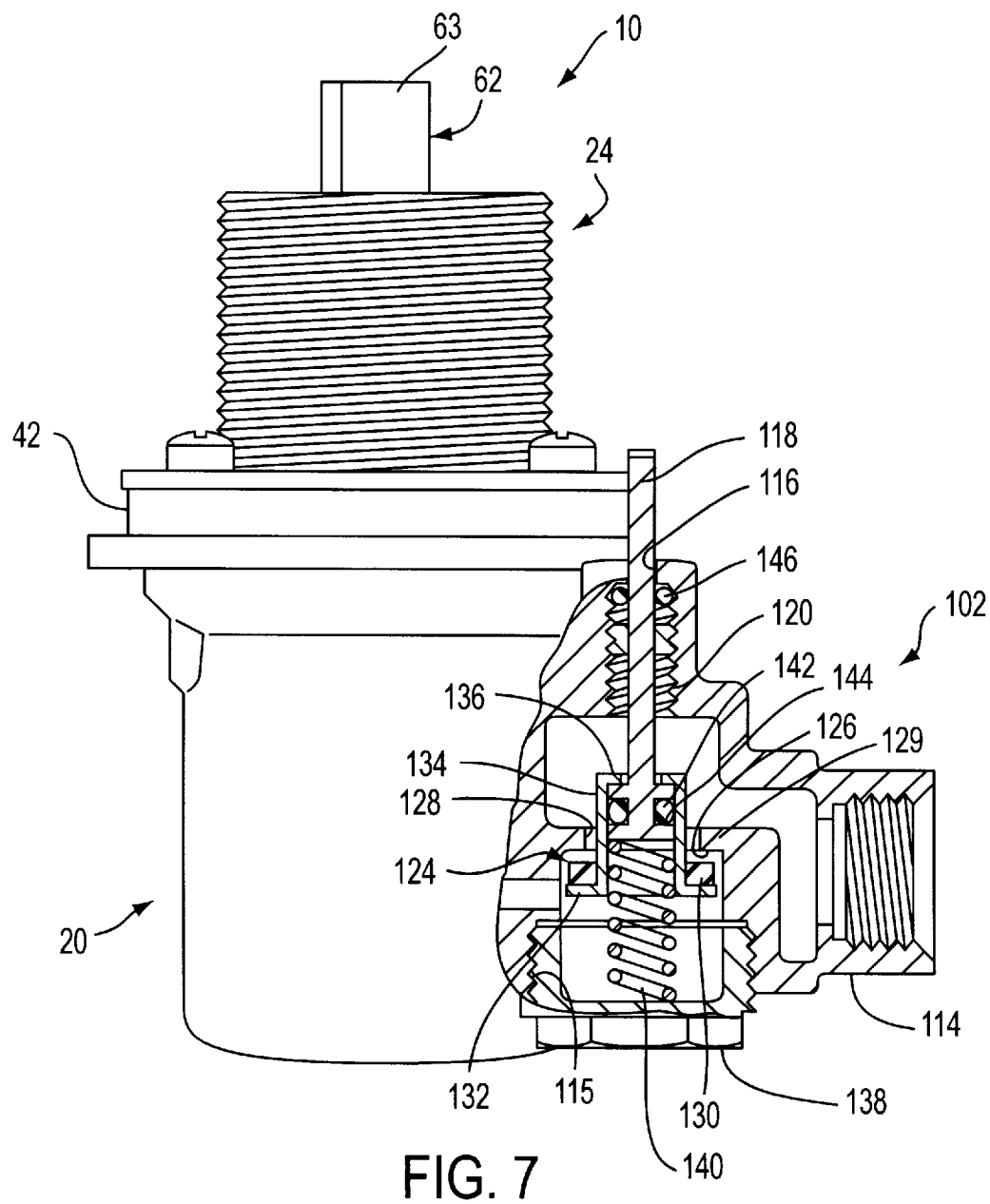
FIG. 7 is an alternative check/stop valve shown in FIG. 5.

If it is desired to locate the check/stop valve closer to the pressure balancer 20 and the temperature controller 24, the bottom loaded check/stop valve 102 shown in FIG. 7 may be used. A casting 114 will be formed with a bottom side threaded opening 115 through which the check/stop valve 102 will be loaded. A top side opening 116 has the valve stem 118 pass therethrough. An enlarged threaded section 120 is formed below the opening 116 to receive a threaded ring 122 affixed to the stem 118 about at the mid-point of its length whereby rotation of the stem 118 within the threaded section 120 will raise or lower a valve closure member 124 relative to the underside of a valve seat 126. The valve seat 126 has an opening 128 therethrough for the hot or cold water supply to pass through the line 34 and/or 38 to enter the pressure balancer 20. The valve seat 126 and opening 128 are formed in an intermediate partition 129 that separate the lines 34 and/or 38 from the pressure balancer 20. The valve closure member 124 includes an annular washer 130 seated on an outwardly extending flange 132 formed at the lower end of a cylindrical member 134 having an inwardly extending flange 136 that extends over the enlarged bottom section of the valve stem 118. The cylindrical member 134 extends through the opening 128. A bottom member 138 is threadedly received in the opening 115 to seal the opening. A spring 140 extends upwardly from the bottom member 138 to engage the enlarged bottom of the stem 118 and urge the valve closure member 124 in the direction of the seat 126. An O-ring 142 is mounted in a recess 144 of the enlarged bottom of the stem 118 to seal the valve closure member 124. Another O-ring 146 is carried on the stem 118 just below the opening 116 to seal and prevent leakage at the opening 116 where the stem 118 exits.

In general, the above-identified embodiments are not to be construed as limiting the breadth of the present invention. Modifications and other alternative constructions will be apparent which are within the scope of the invention as defined in the appended claims.

What is claimed is:

1. A pressure balancer system comprising:
   a. a pressure balancer and temperature controller on one side of the system and a volume controller on the other side of the system;
   b. the pressure balancer to receive hot water and cold water supply at varying pressure and to discharge both the hot water and the cold water flows at a substantially constant preselected pressure;
   c. the temperature controller connected to receive the flow from the pressure balancer and adapted to keep the temperature of the flow below the maximum anti-scald temperature of between 115° F. and 120° F.;
   d. the temperature controller to discharge the mixed flow of hot water and cold water at the preselected temperature;
   e. the volume controller connected to receive the mixed flow from the temperature controller and to adjust the volume of the flow between a minimum flow and a maximum flow;
   f. the temperature controller and the volume controller are interconnected and disposed in spaced relation to each other;
   g. the pressure balancer is interconnected to the temperature controller on the upstream side thereof;
   h. the temperature controller is disposed on the upstream side of the volume controller;
   i. a flow diverter receives the flow from the volume controller and selectively directs it to discharge from a tub spout or a showerhead;
   j. a hot water supply line connects into the pressure balancer;
   k. a cold water supply line connects into the pressure balancer;
   l. a pair of check/stop valves mounted in the supply lines, one in the hot water supply line and one in the cold water supply line;
   m. the check/stop valves adapted to be opened or closed to open or close the supply lines to the pressure balancer;
   n. the check/stop valve has a bottom member threadedly received into the supply line from the bottom external side thereof; and
   o. the check/stop valve connects to the bottom member from the top external side of the supply line to permit the check/stop valve to be disposed immediately adjacent the pressure balancer.

2. A pressure balancer system comprising:
   a. a pressure balancer and temperature controller on one side of the system and a volume controller on the other side of the system;
   b. the pressure balancer to receive hot water and cold water supply at varying pressure and to discharge both the hot water and the cold water flows at a substantially constant preselected pressure;
   c. the temperature controller connected to receive the flow from the pressure balancer and adapted to keep the temperature of the flow below the maximum anti-scald temperature of between 115° F. and 120° F.;
   d. the temperature controller to discharge the mixed flow of hot water and cold water at the preselected temperature;
   e. the volume controller connected to receive the mixed flow from the temperature controller and to adjust the volume of the flow between a minimum flow and a maximum flow;
   f. the temperature controller and the volume controller are interconnected and disposed in spaced relation to each other;
   g. the pressure balancer is interconnected to the temperature controller on the upstream side thereof;
   h. the temperature controller is disposed on the upstream side of the volume controller;
   i. a flow diverter receives the flow from the volume controller and selectively directs it to discharge from a tub spout or a showerhead;
   j. a hot water supply line connects into the pressure balancer;
   k. a cold water supply line connects into the pressure balancer;
   l. a pair of check/stop valves mounted in the supply lines, one in the hot water supply line and one in the cold water supply line;
   m. the check/stop valves adapted to be opened or closed to open or close the supply lines to the pressure balancer; and
   n. the check/stop valve threadedly connected into the flow line from the top external side thereof to open or close the flow therethrough.

* * * * *